(12) United States Patent
Wu et al.

(10) Patent No.: US 12,542,620 B2
(45) Date of Patent: Feb. 3, 2026

(54) DIGITAL RADIO SIGNAL RECEIVER

(71) Applicant: NXP B.V., Eindhoven (NL)

(72) Inventors: Yan Wu, Eindhoven (NL); Boris Petrov Karanov, Eindhoven (NL); Chin-Hung Chen, Eindhoven (NL); Alexander Barry Young, Eindhoven (NL); Wilhelmus Johannes van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 102 days.

(21) Appl. No.: 18/407,039

(22) Filed: Jan. 8, 2024

(65) Prior Publication Data
US 2025/0226901 A1      Jul. 10, 2025

(51) Int. Cl.
*H04H 20/42* (2008.01)
*H04H 20/57* (2008.01)

(52) U.S. Cl.
CPC .......... *H04H 20/426* (2013.01); *H04H 20/57* (2013.01)

(58) Field of Classification Search
CPC ........ H04H 20/426; H04H 20/57; H04B 1/10; H04B 17/29; H04B 17/336; H04B 17/345; H04B 17/3913; H04W 24/08; G01R 31/001; G06N 7/01
See application file for complete search history.

(56) References Cited

U.S. PATENT DOCUMENTS

| | | | | |
|---|---|---|---|---|
| 7,914,468 B2* | 3/2011 | Shalon | ................. | A61B 5/0006 |
| | | | | 600/595 |
| 7,991,770 B2* | 8/2011 | Covell | ................. | H04N 21/812 |
| | | | | 707/758 |
| 8,086,168 B2* | 12/2011 | Moran | ................... | H04H 60/46 |
| | | | | 455/3.06 |
| 8,442,125 B2* | 5/2013 | Covell | ................... | G06Q 30/02 |
| | | | | 725/115 |

(Continued)

FOREIGN PATENT DOCUMENTS

| | | | | |
|---|---|---|---|---|
| CN | 102419999 A | * | 4/2012 | |
| CN | 106877955 A | * | 6/2017 | ............. H04H 60/29 |

(Continued)

OTHER PUBLICATIONS

Karanov, Boris et al.; "Concept and Experimental Demonstration of Optical IM/DD End-to-End System Optimization using a Generative Model"; 2020 Optical Fiber Communications Conference and Exhibition; Mar. 2020; pp. 1-3.

(Continued)

*Primary Examiner* — Berhanu Tadese (57) ABSTRACT

One example discloses a digital radio signal receiver, including: wherein the receiver is configured to be coupled to a device; wherein the device is coupled to receive an RF signal; wherein the RF signal includes a desired signal and interference; wherein the receiver is configured to receive a first signal and interference model from an off-device training stage; an on-device training stage configured to construct a second signal and interference model based on the first (Continued)

signal and interference model and the RF signal received by the device; and a decoder configured to generate a set of data from the RF signal based on the second signal and interference model.

20 Claims, 9 Drawing Sheets

(56) References Cited

U.S. PATENT DOCUMENTS

| | | | | |
|---|---|---|---|---|
| 8,479,225 | B2 * | 7/2013 | Covell | H04N 7/17336 |
| | | | | 725/18 |
| 8,700,641 | B2 * | 4/2014 | Covell | G06F 16/683 |
| | | | | 707/758 |
| 8,750,944 | B2 * | 6/2014 | Rousu | H04B 1/3822 |
| | | | | 455/572 |
| 9,047,540 | B2 * | 6/2015 | Baheti | G06V 30/262 |
| 9,077,581 | B2 * | 7/2015 | Moran | H04H 60/46 |
| 9,639,783 | B2 * | 5/2017 | Baheti | G06V 30/262 |
| 10,186,762 | B2 * | 1/2019 | Papp | H04W 52/0229 |
| 10,361,802 | B1 * | 7/2019 | Hoffberg-Borghesani | |
| | | | | G06F 3/00 |
| 10,812,847 | B2 * | 10/2020 | Patel | H04N 21/482 |
| 11,212,015 | B2 * | 12/2021 | Hess | H04B 15/00 |
| 11,272,236 | B2 * | 3/2022 | Patel | H04N 21/4722 |
| 11,303,346 | B2 * | 4/2022 | Kinamon | H04B 7/06 |
| 11,637,612 | B2 * | 4/2023 | Kinamon | H04L 5/00 |
| | | | | 375/220 |
| 11,669,296 | B2 * | 6/2023 | Cassidy | G06F 3/165 |
| | | | | 700/94 |
| 11,711,561 | B2 * | 7/2023 | Patel | H04H 20/40 |
| | | | | 725/86 |
| 11,870,532 | B2 * | 1/2024 | Kinamon | H04B 7/0697 |
| 12,075,105 | B2 * | 8/2024 | Patel | H04H 60/37 |
| 12,095,781 | B2 * | 9/2024 | Hassan | G06N 7/01 |
| 12,282,703 | B2 * | 4/2025 | Cassidy | G11B 27/036 |
| 2005/0143047 | A1 * | 6/2005 | Kwon | H04B 1/20 |
| | | | | 455/345 |
| 2011/0116515 | A1 * | 5/2011 | Van Houtum | H04L 1/006 |
| | | | | 370/479 |
| 2011/0125063 | A1 * | 5/2011 | Shalon | A61B 5/4205 |
| | | | | 600/590 |
| 2012/0176237 | A1 * | 7/2012 | Tabe | A61B 5/6804 |
| | | | | 340/539.12 |
| 2020/0294401 | A1 * | 9/2020 | Kerecsen | G08G 1/205 |
| 2020/0389469 | A1 * | 12/2020 | Litichever | H04W 12/12 |
| 2021/0356279 | A1 * | 11/2021 | Szigeti | G01C 21/3407 |
| 2021/0367681 | A1 | 11/2021 | Hess et al. | |
| 2022/0123970 | A1 * | 4/2022 | Hirschbeck | H04L 25/03331 |
| 2022/0207993 | A1 * | 6/2022 | Fowe | G06N 7/01 |
| 2022/0247471 | A1 * | 8/2022 | van Houtum | H04B 7/0842 |
| 2023/0188233 | A1 * | 6/2023 | Gupta Hyde | H04B 17/3913 |
| | | | | 370/329 |
| 2024/0088984 | A1 * | 3/2024 | Kinamon | H04B 7/06 |
| 2025/0004122 | A1 * | 1/2025 | Li | G01S 7/006 |

FOREIGN PATENT DOCUMENTS

| | | | | |
|---|---|---|---|---|
| CN | 105379154 | B * | 10/2018 | H04B 7/04 |
| CN | 107210829 | B * | 8/2019 | H04L 1/1838 |
| CN | 110768737 | A * | 2/2020 | H04H 20/36 |
| CN | 111149141 | A * | 5/2020 | G08G 1/164 |
| CN | 115438853 | A * | 12/2022 | G08G 1/0129 |
| CN | 116032392 | A | 4/2023 | |
| CN | 116150741 | A * | 5/2023 | G06F 21/554 |
| CN | 116264726 | A * | 6/2023 | H04W 52/0258 |
| CN | 117341712 | A * | 1/2024 | G06F 18/20 |
| DE | 10026488 | A1 * | 1/2022 | H04L 7/0029 |
| DE | 102022103365 | A1 * | 8/2022 | H04L 1/0057 |
| EP | 4199607 | A1 * | 6/2023 | H04W 52/0258 |
| EP | 4203412 | A1 * | 6/2023 | H03K 19/177 |
| GB | 2496925 | A * | 5/2013 | H04B 1/3822 |
| KR | 20180011051 | A * | 1/2018 | H04H 20/26 |
| KR | 20190019726 | A * | 2/2019 | G10L 15/144 |
| KR | 20190087363 | A * | 7/2019 | B64C 39/024 |
| WO | WO-0193490 | A2 * | 12/2001 | H04J 3/0632 |
| WO | WO-2006033104 | A1 * | 3/2006 | G06F 3/043 |
| WO | WO-2012175636 | A1 * | 12/2012 | H03M 13/6325 |
| WO | WO-2013076679 | A1 * | 5/2013 | H04B 1/3822 |
| WO | WO-2019043446 | A1 * | 3/2019 | G08G 1/205 |
| WO | WO-2019123447 | A1 * | 6/2019 | H04W 12/12 |
| WO | WO-2020012241 | A1 * | 1/2020 | G01C 21/3407 |
| WO | 2020087260 | A1 | 5/2020 | |
| WO | WO-2021195112 | A1 * | 9/2021 | G06N 3/045 |
| WO | WO-2022133356 | A1 * | 6/2022 | H04W 4/20 |
| WO | 2023212059 | A1 | 11/2023 | |
| WO | WO-2025046145 | A1 * | 3/2025 | G01V 3/083 |

OTHER PUBLICATIONS

Farsad, Nariman et al.; "Data-Driven Symbol Detection Via Model-Based Machine Learning"; 2021 IEEE Statistical Signal Processing Workshop; Jul. 2021; pp. 571-575.

Karanov, Boris et al.; "End-to-End Deep Learning of Optical Fiber Communications"; Journal of Lightwave Technology; vol. 36, No. 20; Oct. 15, 2018; pp. 4843-4855.

Shlezinger, Nir et al.; "Learned Factor Graphs for Inference From Stationary Time Sequences"; IEEE Transactions on Signal Processing; vol. 70; pp. 366-380; 2022.

* cited by examiner

DIGITAL RADIO SIGNAL RECEIVER

The present specification relates to systems, methods, apparatuses, devices, articles of manufacture and instructions for receiving digital radio signals.

SUMMARY

According to an example embodiment, a digital radio signal receiver, comprising: wherein the receiver is configured to be coupled to a device; wherein the device is coupled to receive an RF signal; wherein the RF signal includes a desired signal and interference; wherein the receiver is configured to receive a first signal and interference model from an off-device training stage; an on-device training stage configured to construct a second signal and interference model based on the first signal and interference model and the RF signal received by the device; and a decoder configured to generate a set of data from the RF signal based on the second signal and interference model.

In another example embodiment, the digital radio signal receiver is a Digital Audio Broadcasting (DAB) radio receiver.

In another example embodiment, the off-device training stage is a generic off-device training stage; and the on-device training stage is a device-specific on-device training stage.

In another example embodiment, the interference is un-radiated and independent of the RF signal.

In another example embodiment, the device is at least one of: an electronic device, a machine, a vehicle, an electric vehicle (EV), a battery EV, a hybrid EV, and a set of vehicle's having a common manufacturer.

In another example embodiment, the first and second signal and interference models represent the desired signal and the interference using trellis representations.

In another example embodiment, the trellis representations are characterized by transition probability matrices and observation likelihoods.

In another example embodiment, the off-device and on-device training stages represent the desired signal using a first trellis diagram and the interference using a second trellis diagram.

In another example embodiment, the off-device and on-device training stages create the first and second signal and interference models by a Kronecker product matrix multiplication of the first trellis diagram with the second trellis diagram.

In another example embodiment, the off-device training stage is configured to parameterize the first signal and interference model by interpreting the first and second trellis representations as Hidden Markov Models (HMM).

In another example embodiment, the off-device training stage is configured to parameterize the first signal and interference model by interpreting the first and second trellis representations as a shallow neural network (NN).

In another example embodiment, the first signal and interference model is constructed based on a set of domain knowledge.

In another example embodiment, the set of domain knowledge is based on a different set of RF signals received by a different set of digital radio receivers coupled to a different set of devices.

In another example embodiment, the first and second signal and interference models are Hidden Markov Models (HMM).

In another example embodiment, the first and second signal and interference models are generated using Bayesian probability theory with message passing.

In another example embodiment, the second signal and interference model is constructed by the on-device training stage when the device acquires the RF signal.

In another example embodiment, further comprising an on-device updating stage that includes iteratively updating the second signal and interference model using the decoder.

In another example embodiment, the updating includes tracking real-time variations of the received RF signal.

In another example embodiment, the off-device training stage is configured to initialize the first signal and interference model.

In another example embodiment, the off-device training stage is configured to parameterize the first signal and interference model by interpreting the first and second trellis representations as a combination of Hidden Markov Models (HMM) and a shallow neural network (NN).

According to an example embodiment, a method for receiving a digital radio signal by a device, comprising: receiving an RF signal that includes a desired signal and interference; constructing a first signal and interference model during an off-device training stage; constructing a second signal and interference model during an on-device training stage based on the first signal and interference model and the RF signal received by the device; and decoding a set of data from the RF signal based on the second signal and interference model.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Electric Vehicles (EVs) produce extremely-diverse interference-signals that degrade or even makes the reception of Digital Audio Broadcasting (DAB) data and audio streams impossible. Example EV noise sources include the charger, the DC-DC converter, the electric motor powertrain, and any other high-power switching.

Some DAB-Spatial Noise Cancellation receivers use multiple antennas to improve the DAB reception in the presence of EV interference. Other DAB receivers may use an iterative decoding approach where dedicated silicon is implemented to support the iterative decoding architecture; however, these receivers treat the EV interference as noise.

Now discussed is a hybrid Artificial Intelligence/Machine Learning (AI/ML) EV interference rejection system and method that reduce interference by considering the received signal and EV interference underlying structures. The system and method defines a solution space based on Bayesian probability theory with message passing, such as used in Hidden Markov Models (HMM). Novel probabilistic models for mitigating the detrimental effects of the EV interference are employed using AI/ML approaches for the learning and adaption of these models.

In some example embodiments, a three-stage AI/ML based interference rejection architecture is used.

In the first stage, an off-DAB-device/receiver initialization generates/constructs a first joint signal and EV interference model based on graph and Bayesian probability theory. This model is initialized via an off-line optimization using synthetic and field test data to ensure rapid convergence of the on-DAB-device/receiver optimization.

In some example embodiments, of the off-device training stage, a large training database is gathered via extensive field recordings. A hybrid AI/ML approach is used based on Bayesian probability theory with message passing. This approach is applied to learn the HMM model of the signal and the interference to obtain the likelihood and the transition matrix. The model can be specific for different types (e.g., battery electric vehicle and hybrid vehicle), different brands, and different models of vehicles. The outcome of this stage is a good initialization/prior for the subsequent stages.

In the second stage, an on-DAB-device/receiver generates a second model that tailors/optimizes the first model to further improve the initialization from the off-device training. The model is first adapted for operation in the DAB scenario during the acquisition phase of the reception and utilizes a short data acquisition period thanks to the less stringent latency requirements of DAB. Tailoring the off-device training results in a faster convergence.

In some example embodiments, of the on-device training stage, the hybrid AI/ML approach is also applied to further improve the signal and interference model and the likelihood for specific vehicles. Thanks to a less strict latency requirement of the digital broadcasting system and the low-complexity hybrid approach used, on-device training can be performed during the acquisition phase of the reception. Thanks to the good initialization, the on-device training can converge faster.

In the third stage, the second model is continuously fine-tuned using on-device learning/updates based on real-time operational conditions via a unique iterative decoding architecture. In some example embodiments, a soft-information feedback approach is used to follow the real-time behavior of the system.

In some example embodiments, of the on-device learning/update stage, the second model and likelihood are further updated via iterative approaches (e.g. using an iterative decoder) to track real-life and real-time variations of channel (e.g. channel state information (CSI)) and interference conditions. This is performed for the channel that the receiver is tuned to. In some embodiments, a virtual tuner, or a background tuner can be used to learn/update the HMM model for a different channel in the background.

Overview

Figure 1:
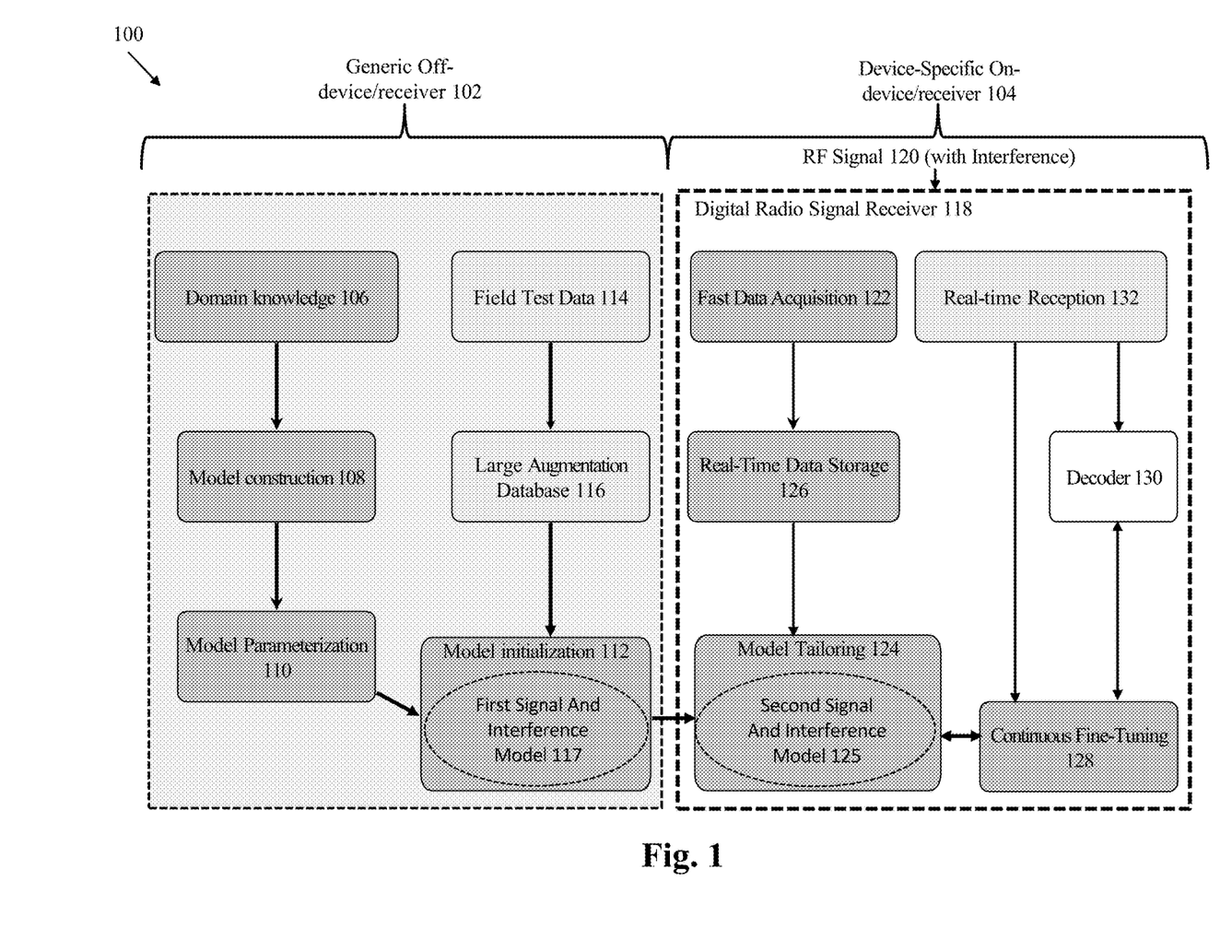
FIG. 1 represents an example of a digital radio system.

FIG. 1 represents an example of a digital radio system 100. The system 100 includes a generic off-DAB-device/receiver portion 102 that performs model construction 108, parameterization and initialization. The system 100 also includes a device-specific on-DAB-device/receiver portion 104 that performs model tailoring and continuous finetuning. In some example embodiments, the system 100 uses a hybrid AI/ML EV interference rejection method in DAB systems.

In the first stage, the generic off-DAB-device/receiver portion 102 includes a set of domain knowledge 106, model construction 108, model parameterization 110, and model initialization 112.

The available domain knowledge 106 is utilized by the model construction 108 via graph and Bayesian probability theory for the construction of a first signal and interference model (e.g. an advanced joint signal and EV interference model).

The model parameterization 110 parameterizes the first signal and interference model 117, enabling its optimization in a data-driven manner.

The model initialization 112 initializes the parameterized first model 117 using both synthetic and collected field test data 114 stored in a large augmentation database 116.

In the second stage, the first model 117 is then transmitted (e.g. deployed) to a digital radio signal receiver 118 in the on-DAB-device/receiver portion 104. The digital radio signal receiver 118 is configured to be coupled to a device (not shown) to receive an RF signal 120.

The RF signal 120 in various example embodiments includes an interference component. The device (not shown) in many various example embodiments could be at least one of: an electronic device, a machine, a vehicle, an electric vehicle (EV), a battery EV, a hybrid EV, and a set of vehicle's having a common manufacturer.

In many example embodiments, good initialization is crucial for rapid on-DAB-device/receiver 104 convergence and overall system 100 performance, there exists a natural discrepancy between the data used in the generic off-DAB-device/receiver portion 102 and the specific communication scenario for the device where the first model 117 is applied.

Thus the device-specific on-DAB-device/receiver portion 104 includes a fast data acquisition 122 and model tailoring 124 for tailoring the first model 117 into a second signal and interference model 125 that is device-specific.

The fast data acquisition 122 is stored in real-time data storage 126. Note, due to less stringent latency requirements in DAB systems, the fast data acquisition 122 stage and storage of the collected data in the real-time data storage 126 at run time can conveniently enable direct adaptation of the initialized model.

In the third stage, continuous fine-tuning 128 and a decoder 130 receive the RF signal 120 with interference through real-time reception 132. The continuous fine-tuning 128 and the decoder 130 perform iterative decoding so that the second model 125 can be continuously fine-tuned, during real-time reception 132, to the changing communication/channel conditions.

Model Construction 108

Figure 2:
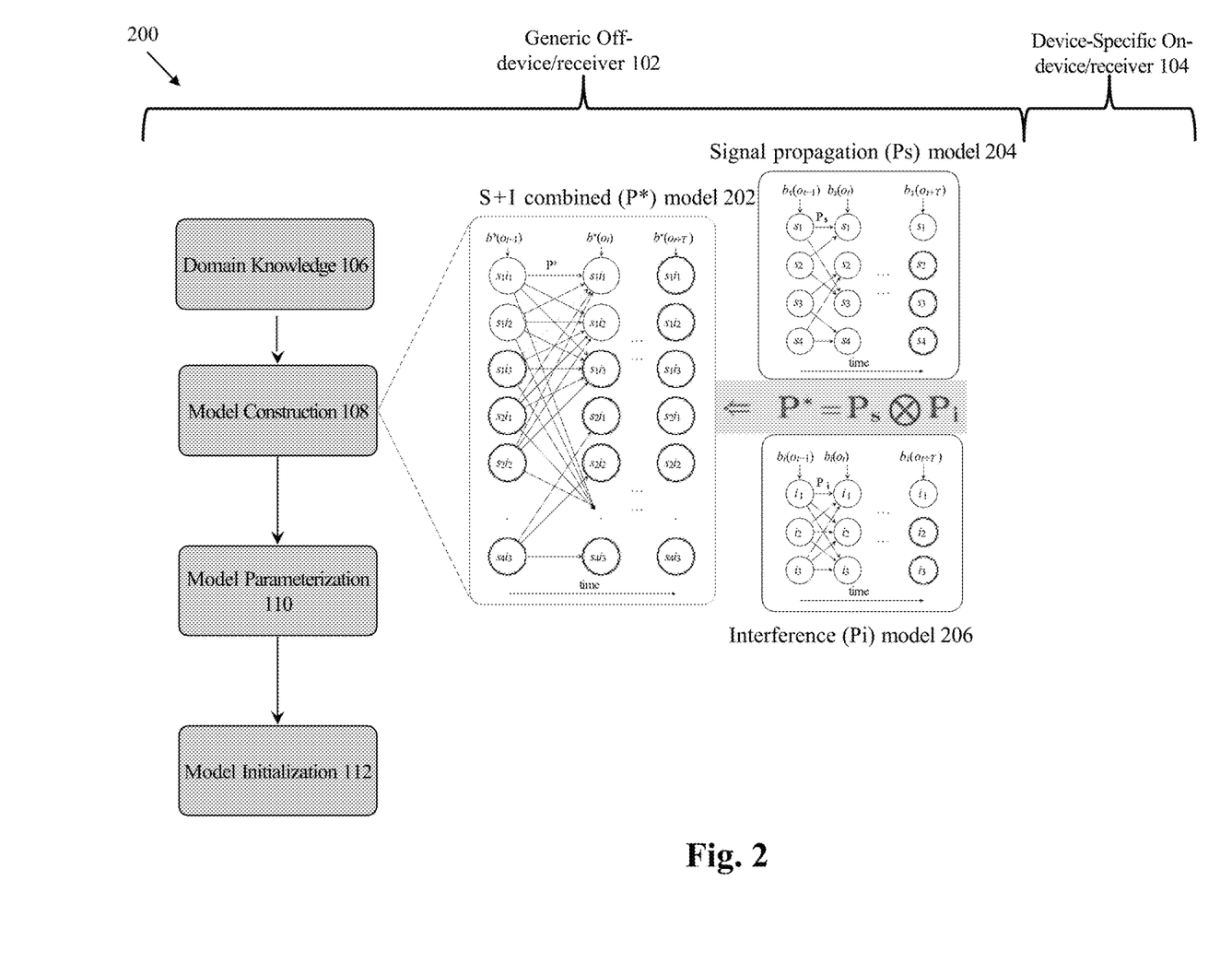
FIG. 2 shows an example embodiment of construction of a first signal and interference model for the digital radio system.

FIG. 2 shows an example embodiment 200 of construction 108 of the first signal and interference model 117 for the digital radio system 100.

The first model 117 construction 108 utilizes graph theory as well as Bayesian probability theory. The first model 117 incorporates the domain knowledge 106 using trellis representations of multi-path signal propagation 204 and time-varying interference 206, which is "un-radiated" (i.e. independent of the broadcasted signal).

The two trellis representations 204 and 206 are characterized by transition probability matrices ($P_s$ and $P_i$) and corresponding observation likelihoods ($b_s(o_t)$ and $b_i(o_t)$).

Subsequently, the first model 117 (e.g. the joint signal and EV interference model) is obtained via a S+I combined model 202, which is a combination (e.g. Kronecker product matrix multiplication operations) of the two constituent models 204, 206.

The obtained model inherently incorporates all possible (allowed) transitions between joint multi-path and interference states and thus captures a temporal structure of the underlying processes that affect the received RF signal 120. Trellis-based multi-path (inter-symbol interference) propagation models are also used in wireless communications, and trellis-based interference (impulse noise) models are also used in power-line communications.

Model Parameterization 110

Figure 3A:
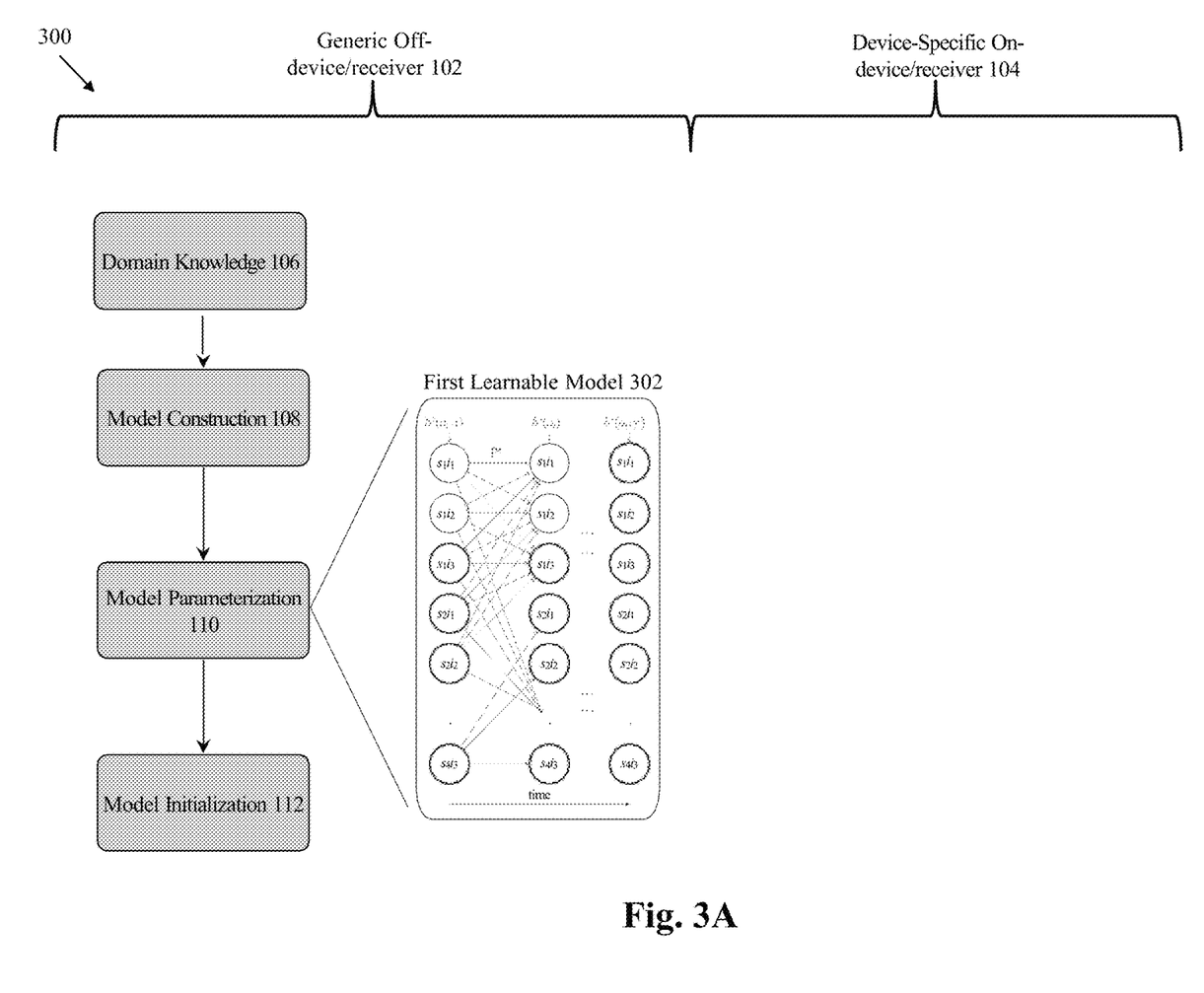
FIG. 3A represents a first example embodiment of parameterization of the first signal and interference model for the digital radio system.

FIG. 3A represents a first example embodiment 300 of parameterization 110 of the first signal and interference model 117 for the digital radio system 100. The first example 300 employs fully learnable transition matrix and observation likelihoods.

After the first model 117 is constructed using trellis diagrams incorporating the domain knowledge 106, parameterization 110 generates a learnable model 302, which can then be systematically further optimized into the second model 125. Parameterization 110 ensures that both the observation likelihood function (b(ot)) and the transition matrix (P*) are parameterized and thus available for learning.

In literature, it has been suggested that the likelihoods of a trellis-based model can be learned from data using a (shallow) neural network (NN) trained on a relatively small labeled dataset. However, this NN approach is not directly applicable for learning the transition matrix of the first model 117.

Therefore, here parameterization 110 views the trellis as representing a Hidden Markov Model (HMM) and uses the available techniques for the optimization of HMM. Namely, both the likelihoods (b(ot)) as well as the transition matrix (P*) can for example be trained via sequences of training data input to the Baum-Welch algorithm for training HMMs, which in turn consists in using forward-backward Bayesian computation of probabilities and expectation maximization (EM).

Figure 3B:
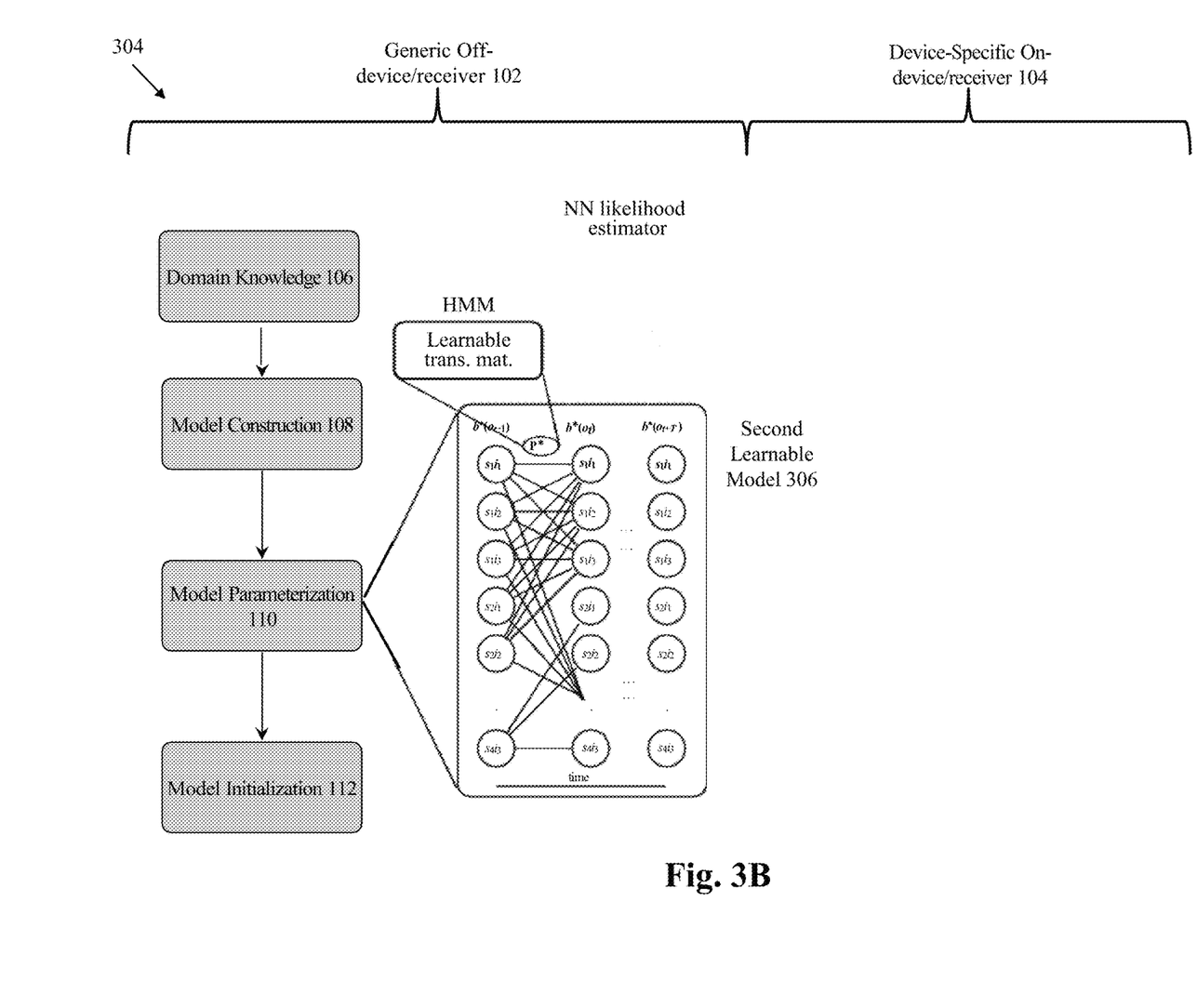
FIG. 3B represents a second example embodiment of parameterization of the first signal and interference model for the digital radio system.

FIG. 3B represents a second example embodiment 304 of parameterization 110 of the first signal and interference model 117 for the digital radio system 100. The second example 304 generates a second learnable model 306 utilizing a shallow neural network (NN) for the observation likelihood estimation. Alternatively, both the transition matrix and the observation likelihood can be learned using Hidden Markov Model techniques (e.g. the Baum-Welch algorithm).

Model Initialization 112

Figure 4:
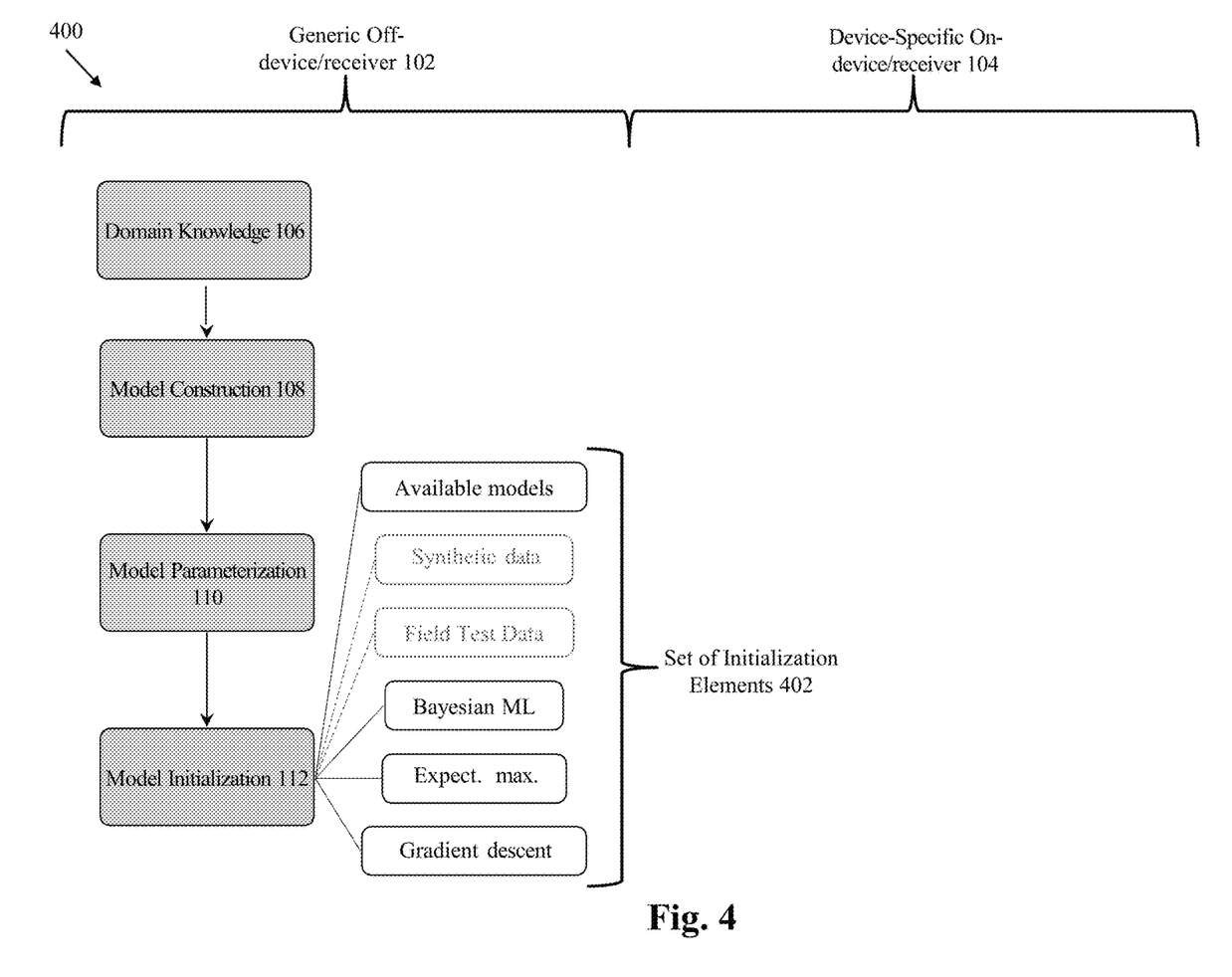
FIG. 4 represents an example embodiment of initialization of the first signal and interference model for the digital radio system.

FIG. 4 represents an example embodiment 400 of initialization 112 of the first signal and interference model 117 for the digital radio system 100. An example set of initialization elements 402 are shown.

At model initialization 112, the developed learnable model 302, 306 of the first model 117 is optimized prior to deployment in an "off-line" manner using synthetic data from an interference source generator and/or other field-tests. Formal initialization 112 prevents any random initialization of the first model 117, which could lead to problems in convergence and thus limit the performance during system 100 operations.

Note that if sufficiently accurate and representative model parameters are available as prior knowledge, these can also be utilized before the optimization with synthetic and field test data. Depending on the algorithm choices initialization can be performed using Bayesian probability theory via the forward-backward and the expectation maximization algorithms. Alternatively, if a neural network is employed for computation of the likelihoods, then initialization would also involve a gradient descent algorithm.

Note that, while in principle the HMM optimization framework can be performed in an un-supervised manner via the Baum-Welch algorithm, using NNs would typically require a labeled dataset for supervised learning. In the case of off-DAB-device/receiver optimization and synthetically generated data labels might often be readily available. On the other hand, during field test data collections, ground truth data (e.g. recording near base stations) needs to be incorporated as well.

On-DAB-Device/Receiver Data Acquisition

Figure 5:
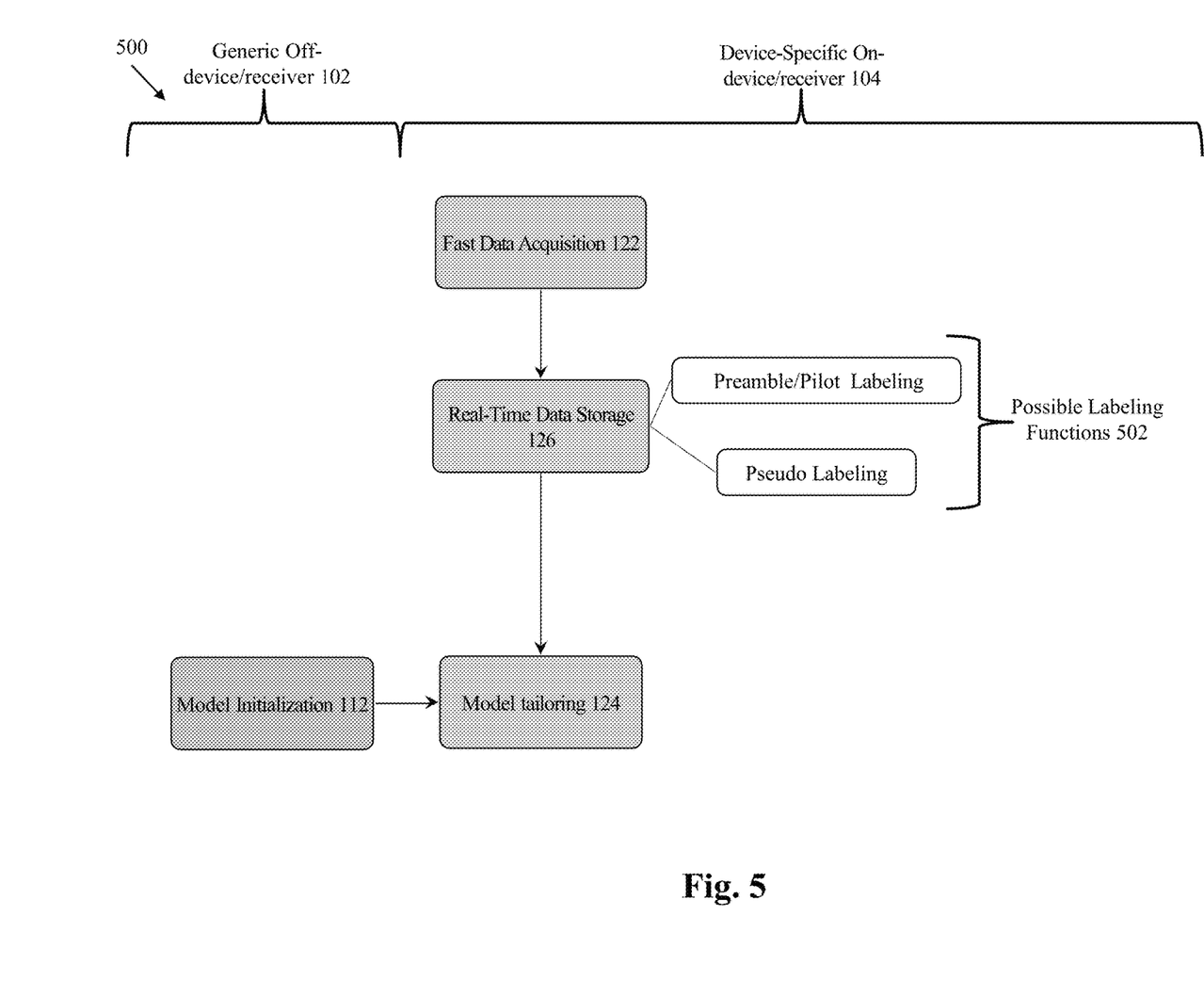
FIG. 5 represents an example embodiment of possible labeling functions for the device-specific on-DAB-device/receiver portion.

FIG. 5 represents an example embodiment 500 of possible labeling functions 502 for the device-specific on-DAB-device/receiver portion 104. The first model 117 is initialized in the generic off-DAB-device/receiver portion 102 and then sent to the device-specific on-DAB-device/receiver portion 104 for use in the specific device (not shown, but introduced above).

Naturally, there will be discrepancies between the conditions for which the first model 117 was initialized and the device specific communication scenario and interference signatures. Therefore, as introduced above the device-specific on-DAB-device/receiver portion 104 employs fast data acquisition 122 of the received RF signal 120 which is then used to generate the second model 125.

DAB applications allow for relaxed latency requirements, which can be exploited to collect a small database "on-the-fly" at run time (i.e. the real-time data storage 126).

A chosen optimization framework for the parameterized joint signal and interference model might require supervised learning and thus labeled data (e.g. when NNs are used). In such a case, frame preambles or short pilot sequences can be utilized. Alternatively, the initialized model can be employed in a semi-supervised frameworks, e.g. pseudo-labeling, where the unlabeled data is assigned a label based on the initialized NN model prediction.

Model Tailoring

Figure 6:
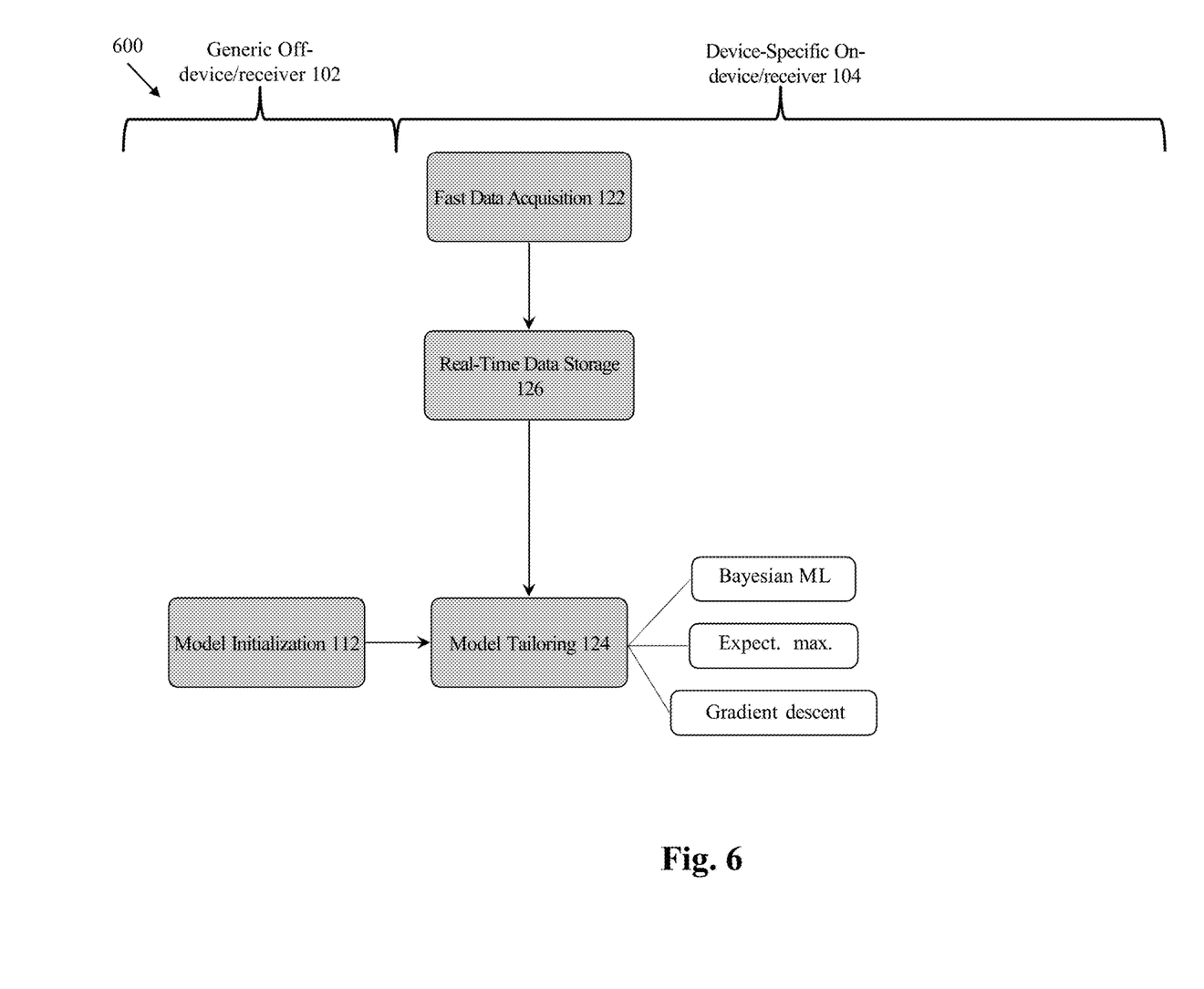
FIG. 6 represents an example embodiment of model tailoring the first signal and interference model for the digital radio system into the second signal and interference model.

FIG. 6 represents an example embodiment 600 of model tailoring 124 the first signal and interference model 117 for the digital radio system 100 into the second signal and interference model 125.

The first model 117 can be tailored into the second model 125 which is specific to both the device type and a real-time communications environment. Note that when NN is used, this can be done once the necessary labels 502 are available. The algorithms for NN/HMM optimization (i.e. gradient descent and/or forward-backward algorithm and EM) are reused. Note that while in the generic off-DAB-device/receiver portion 102 learning phase these algorithms can be run for a number of iterations to provide a good starting set of parameters. In the device-specific on-DAB-device/receiver portion 104 model tailoring 124 stage only a small amount of data that needs to be used to rapidly adapt the already optimized first model 117.

Continuous Fine-Tuning

As introduced in FIG. 1, the third stage involves continuous fine-tuning 128 of the second model 125 in real-time during reception of the RF signal 120 using iterative decoding of the decoder 130. This allows continuous "fine-grained" adaptation to fast varying RF signal 120 and/or environmental/channel conditions which might not be captured by the acquisition stage.

Since the first and second models 117, 125 are built as a trellis diagrams, they can be readily used with signal reception algorithms, such as BCJR and Viterbi. This trellis diagram approach is a much lower complexity approach than a full-blown deep learning solution. This trellis diagram also specifically captures underlying structures of RF signal 120, propagation effects, as well as any interference. The full parameterization of the first and second models 117, 125 using these trellis diagrams allows dynamic adaptations in a data-driven manner.

Figure 7:
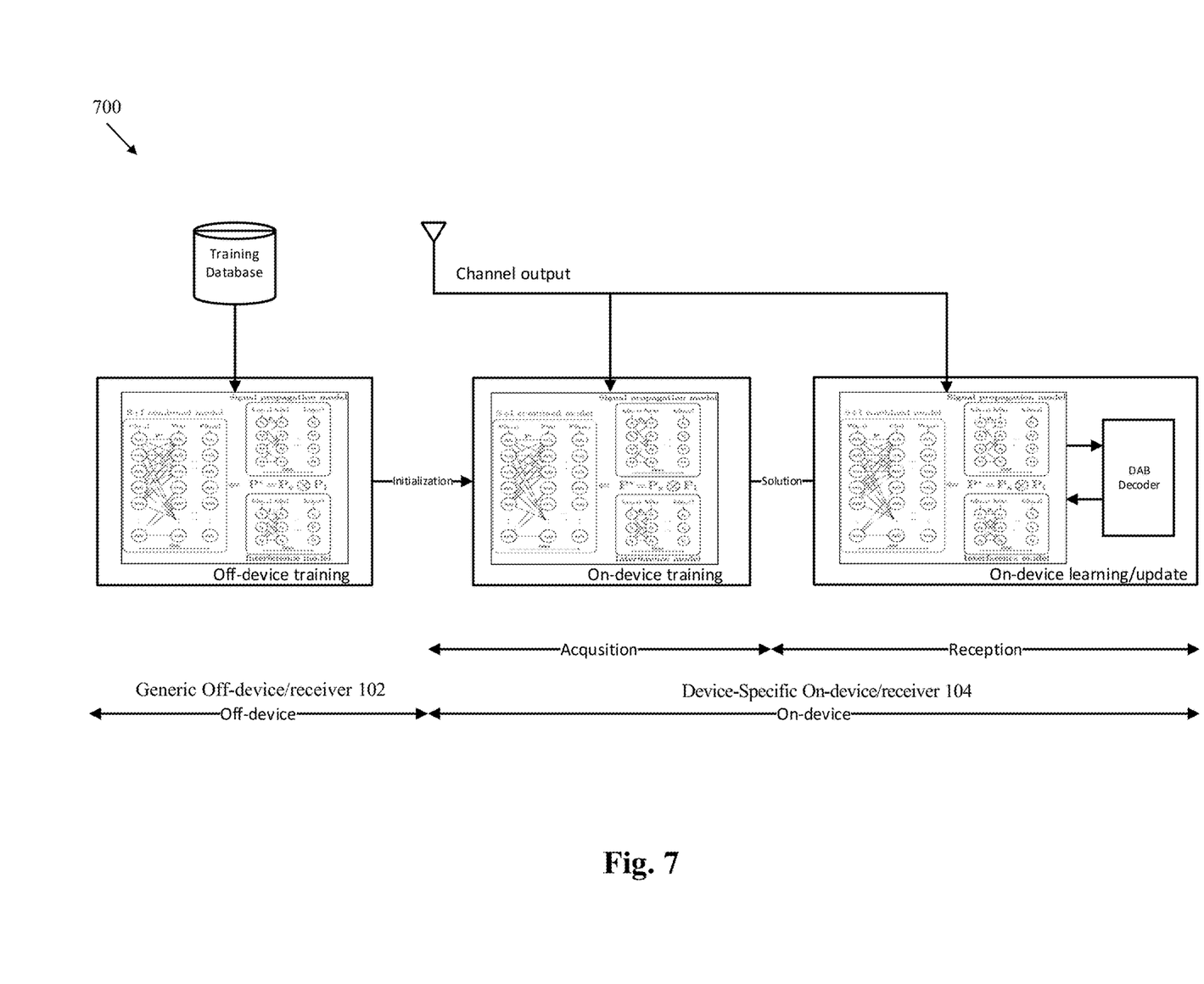
FIG. 7 represents an operational example of the digital radio signal receiver.

FIG. 7 represents an operational example 700 of the digital radio signal receiver 100. The operational example 700 shows example functionality performed in the generic off-DAB-device/receiver portion 102 and the device-specific on-DAB-device/receiver portion 104.

Figure 8:
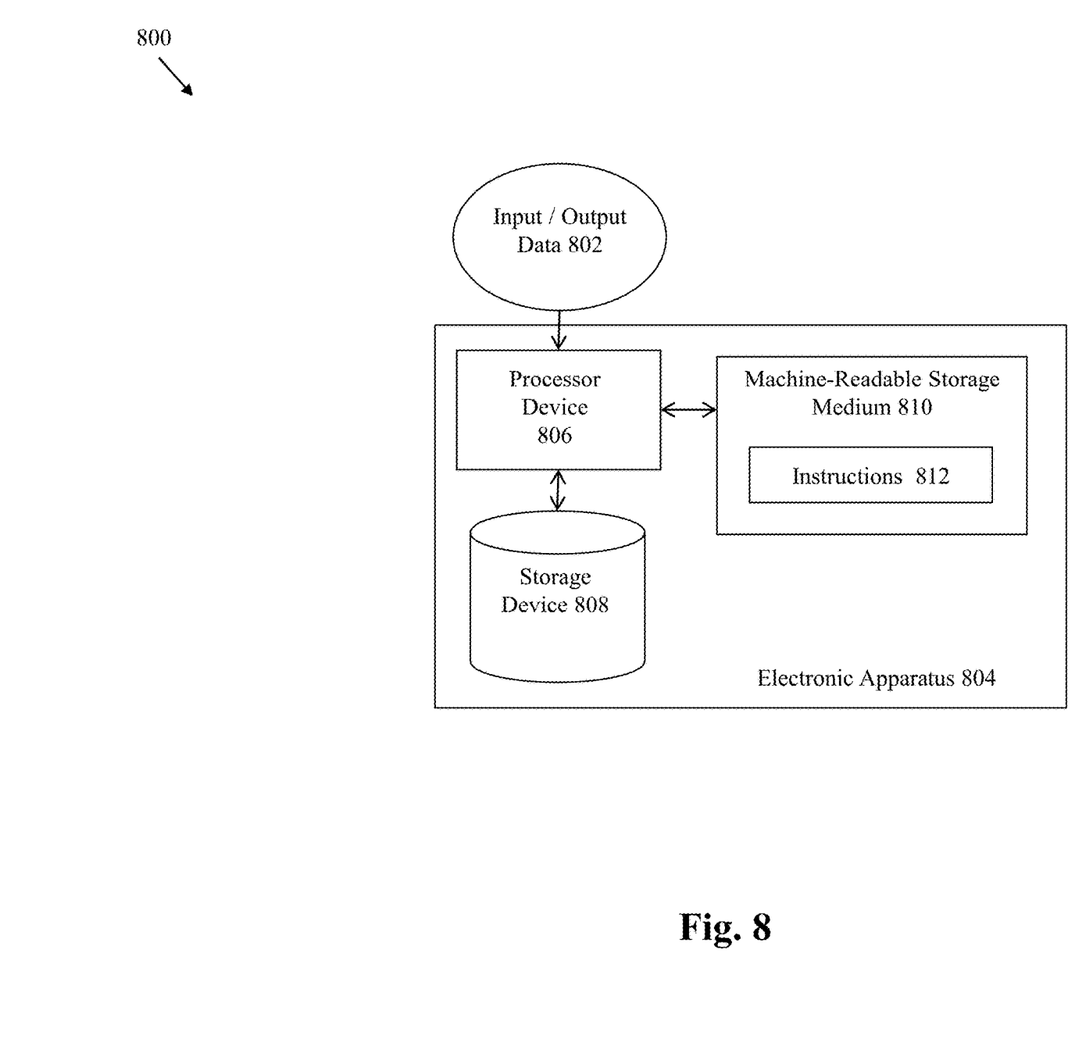
FIG. 8 represents an example system for hosting instructions for enabling the digital radio signal receiver.

FIG. 8 represents an example 800 system for hosting instructions for enabling the digital radio signal receiver 100. The system 800 shows an input/output data 802 interface with an electronic apparatus 804. The electronic apparatus 804 includes a processor 806, a storage device 808, and a non-transitory machine-readable storage medium 810. The machine-readable storage medium 810 includes instructions 812 which control how the processor 806 receives input data 802 and transforms the input data into output data 802, using data within the storage device 808. Example instructions 812 stored in the machine-readable storage medium 810 are discussed elsewhere in this specification. The machine-readable storage medium in an alternate example embodiment is a non-transitory computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transitory machine-readable storage medium using a bus and performs operations and tasks that implement one or more instructions stored in the machine-readable storage medium. The machine-readable storage medium in an alternate example embodiment is a computer-readable storage medium.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A digital radio signal receiver, comprising:
an on-device training stage; and
a decoder;
wherein the receiver is configured to be coupled to a device;
wherein the device is coupled to receive an RF signal;
wherein the RF signal includes a desired signal and interference;

wherein the receiver is configured to receive a first signal and interference model from an off-device training stage;

wherein the on-device training stage is configured to construct a second signal and interference model based on the first signal and interference model and the RF signal received by the device;

wherein the decoder is configured to generate a set of data from the RF signal based on the second signal and interference model;

wherein the off-device or on-device training stages represent the desired signal using a first trellis diagram and the interference using a second trellis diagram; and wherein the off-device or on-device training stages create the first and second signal and interference models by a Kronecker product matrix multiplication of the first trellis diagram with the second trellis diagram.

2. The receiver of claim 1:
wherein the digital radio signal receiver is a Digital Audio Broadcasting (DAB) radio receiver.

3. The receiver of claim 1:
wherein the off-device training stage is a generic off-device training stage; and
wherein the on-device training stage is a device-specific on-device training stage.

4. The receiver of claim 1:
wherein the interference is un-radiated and independent of the RF signal.

5. The receiver of claim 1:
wherein the device is at least one of: an electronic device, a machine, a vehicle, an electric vehicle (EV), a battery EV, a hybrid EV, and a set of vehicle's having a common manufacturer.

6. The receiver of claim 1:
wherein the first and second signal and interference models represent the desired signal and the interference using trellis representations.

7. The receiver of claim 6:
wherein the trellis representations are characterized by transition probability matrices and observation likelihoods.

8. The receiver of claim 1:
wherein the off-device training stage is configured to parameterize the first signal and interference model by interpreting the first and second trellis representations as Hidden Markov Models (HMM).

9. The receiver of claim 1:
wherein the off-device training stage is configured to parameterize the first signal and interference model by interpreting the first and second trellis representations as a shallow neural network (NN).

10. The receiver of claim 1:
wherein the first signal and interference model is constructed based on a set of domain knowledge.

11. The receiver of claim 1:
wherein the set of domain knowledge is based on a different set of RF signals received by a different set of digital radio receivers coupled to a different set of devices.

12. The receiver of claim 1:
wherein the first and second signal and interference models are Hidden Markov Models (HMM).

13. The receiver of claim 1:
wherein the first and second signal and interference models are generated using Bayesian probability theory with message passing.

14. The receiver of claim 1:
wherein the second signal and interference model is constructed by the on-device training stage when the device acquires the RF signal.

15. The receiver of claim 1:
further comprising an on-device updating stage that includes iteratively updating the second signal and interference model using the decoder.

16. The receiver of claim 15:
wherein the updating includes tracking real-time variations of the received RF signal.

17. The receiver of claim 1:
wherein the off-device training stage is configured to initialize the first signal and interference model.

18. The receiver of claim 1:
wherein the off-device training stage is configured to parameterize the first signal and interference model by interpreting the first and second trellis representations as a combination of Hidden Markov Models (HMM) and a shallow neural network (NN).

19. A method for receiving a digital radio signal by a device, the method comprising:
receiving an RF signal that includes a desired signal and interference;
constructing a first signal and interference model during an off-device training stage;
constructing a second signal and interference model during an on-device training stage based on the first signal and interference model and the RF signal received by the device; and
decoding a set of data from the RF signal based on the second signal and interference model;
wherein the off-device or on-device training stages represent the desired signal using a first trellis diagram and the interference using a second trellis diagram; and
wherein the off-device or on-device training stages create the first and second signal and interference models by a Kronecker product matrix multiplication of the first trellis diagram with the second trellis diagram.

20. A digital radio signal receiver, comprising:
an on-device training stage; and
a decoder;
wherein the receiver is configured to be coupled to a device;
wherein the device is coupled to receive an RF signal;
wherein the RF signal includes a desired signal and interference;
wherein the receiver is configured to receive a first signal and interference model from an off-device training stage;
wherein the on-device training stage is configured to construct a second signal and interference model based on the first signal and interference model and the RF signal received by the device;
wherein the decoder is configured to generate a set of data from the RF signal based on the second signal and interference model;
wherein the off-device or on-device training stages represent the desired signal using a first trellis diagram and the interference using a second trellis diagram; and
wherein the off-device training stage is configured to parameterize the first signal and interference model by interpreting the first and second trellis representations as a combination of Hidden Markov Models (HMM) and a shallow neural network (NN).

* * * * *